United States Patent [19]

Stauffer

[11] E Patent Number: Re. 32,886

[45] Reissued Date of Patent: Mar. 14, 1989

[54] DIGITAL AUTO FOCUS

[75] Inventor: Norman L. Stauffer, Englewood, Colo.

[73] Assignee: Honeywell, Inc., Minneapolis, Minn.

[21] Appl. No.: 405,487

[22] Filed: Aug. 5, 1982

Related U.S. Patent Documents

Reissue of:

[64] Patent No.: 4,078,171
Issued: Mar. 7, 1978
Appl. No.: 696,170
Filed: Jun. 14, 1976

[51] Int. Cl.[4] ..... G01J 1/20

[52] U.S. Cl. ..... 250/201; 250/209; 354/400

[58] Field of Search ..... 250/201, 209, 208, 216; 356/1, 4, 125; 355/56, 52-61; 354/25, 195, 198; 352/140

[56] References Cited

U.S. PATENT DOCUMENTS

| | | | |
|---|---|---|---|
| 3,532,045 | 10/1970 | Genahr | 355/56 |
| 3,791,735 | 2/1974 | Nakazawa et al. | 356/4 |
| 3,832,058 | 8/1974 | Gusovius | 354/198 |
| 3,846,628 | 11/1974 | Towne | 250/201 |
| 3,859,518 | 1/1975 | Sander | 250/209 |
| 3,875,401 | 4/1975 | Stauffer | 250/209 |
| 3,945,023 | 3/1976 | Stauffer | 356/4 |
| 3,958,117 | 5/1976 | Stauffer | 356/4 |
| 4,004,852 | 1/1977 | Pentecost | 250/201 |

OTHER PUBLICATIONS

Furman et al, "Semiconductor Range-Finding System" IBM Technical Disclosure Bulletin, vol. 16, #1, Jun. 1973, pp. 44-46.

Tateishi, I, Japanese Patent Application, 47-84878, Laid-Open date 4/17/1974.

*Primary Examiner*—David K. Moore

*Attorney, Agent, or Firm*—Charles J. Ungemach

[57] ABSTRACT

A digital auto focus system includes first and second detector arrays which receive first and second detection images of an object. The detection images are displaced by a number n of detectors depending upon the distance between the object and the detector arrays. The output signals of the detector arrays are processed to provide a signal indicative of the number n. This signal may be used, for example, to control the position of a lens in a photographic system.

3 Claims, 2 Drawing Sheets

DIGITAL AUTO FOCUS

Matter enclosed in heavy brackets [ ] appears in the original patent but forms no part of this reissue specification; matter printed in italics indicates the additions made by reissue.

BACKGROUND OF THE INVENTION

The present invention relates generally to apparatus for providing a measure of the distance between the apparatus and an object. The apparatus of the present invention has particular importance in the field of distance determining and automatic focusing.

Distance determining and automatic focusing arrangements have received considerable attention in recent years. One advantageous type of distance determining and automatic focusing apparatus is the spatial image correlation type. Examples of the different forms of arrangements of this type can be found in my copending application, Ser. No. 627,607, filed Oct. 31, 1975, now U.S. Pat. No. 4,002,899, in my U.S. Pat. Nos. 3,836,772, 3,838,275, and 3,958,117, and in U.S. Pat. No. 3,274,914 by Biederman et al.

The typical spatial image correlation apparatus includes two auxiliary optical elements (e.g. lenses or mirrors) and two detector arrays. The object distance is determined by relatively moving one of the auxiliary optical elements and one of the radiation responsive detector arrays until they occupy a critical or correlation position. This position is a measure of the existing object to apparatus distance.

The relative movement of the auxiliary optical element and the detector array occurs for each distance measuring or focusing operation. The critical condition occurs when there is best correspondence between the radiation distributions of two auxiliary or detection images formed on the two detector arrays. This condition of best distribution correspondence results in a unique value or effect in the processed electrical output signals.

In most systems, the relative movement of the auxiliary optical element with respect to the detector arrays is achieved by moving a lens or mirror relative to one of the detector arrays. The particular position of the element when best distribution correspondence occurs provides a determination of the existing object apparatus distance. In an automatic focusing system, the position of the auxiliary optical element at the time of correlation is used to control the position of a primary optical element, such as a camera taking lens.

Although distance determining and automatic focusing arrangements of this type have many advantages, they also have some disadvantages. In particular, the required movement of an auxiliary optical element and the accurate determination of the position of that element when correlation occurs leads to considerable mechanical and electrical complexity. It also requires some form of motive means to provide the motion of the auxiliary optical element. This can create a problem, particularly in automatic focusing cameras in which size and weight constraints are critical. The additional complexity and the requirement of some form of motive means increases cost as well as weight and size and increases the likelihood of mechanical failure.

In my U.S. Pat. No. 3,945,023, a distance determining and automatic focusing system which does not require a scanning mirror or lens is disclosed. The outputs of detectors in two detector arrays of unequal length are compared and processed to provide an indication of distance to an object. The primary lens is moved to a particular zone depending upon the result of this processing. While this system does not require a scanning mirror or lens, it becomes difficult to implement in practice. In particular, for high accuracy, a relatively large number of zones is required. The signal processing required by this system becomes cumbersome as the number of zones becomes large.

SUMMARY OF THE INVENTION

The apparatus of the present invention includes first and second detector arrays for producing output signals indicative of radiation received. The first detector array receives a first detection image of the object, and the second detector array receives a second detection image of the object. The second detection image is displaced by a number n of detectors in the second detector array with respect to corresponding detectors of the first detector array. The number n is indicative of the distance between the object and the first and second detector arrays. Signal processing means receives the output signals from the first and second detector arrays and provides an output signal indicative of the number n. The output signal, therefore, is indicative of the distance between the object and the first and second detector arrays.

DETAILED DESCRIPTION OF PREFERRED EMBODIMENTS

Figure 1:
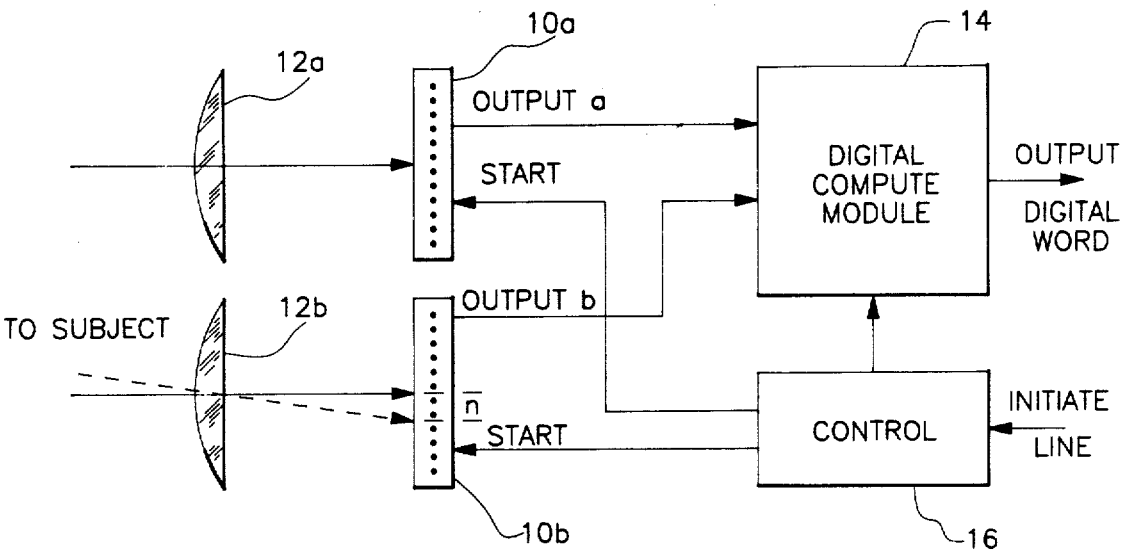
FIG. 1 shows the distance determining apparatus of the present invention.

FIG. 1 shows the digital distance determining apparatus of the present invention. This system does not require difficult analog methods, has no moving parts, and gives a digital output which allows the apparatus to be used in a variety of systems.

The digital distance determining system includes two separate multi-element radiation sensitive detector arrays 10a and 10b of "N" elements each. These detector arrays are preferably fabricated as part of a single monolithic integrated circuit and include a very large number N of individual detector elements. When a large number of individual detector elements is used (i.e. N is large), accurate distance determination can be made with arrays of equal length. The equal length greatly simplifies signal processing. Detector arrays 10a and 10b are preferably charge coupled device (CCD) or charge injection device (CID) arrays. In one preferred embodiment, detector arrays 10a and 10b are 128 element CCD arrays.

Lenses 12a and 12b are associated with detector arrays 10a and 10b, respectively, Lens 12a forms a first detection image of the object at detector array 10a. Lens 12b similarly forms a second detection image of the object at the second detector array 10b.

The relative position of the first and second detection images on first and second detector arrays 10a and 10b is related to the range or distance to the object. The displacement of the second detection image with respect to the corresponding detectors of the first detector array is given by the number "n", where $n<N$. In practice, N is preferably large, e.g. 128, and the maximum value of n, which corresponds to the nearest subject distance to be considered, is in the range of about 10 to about 30. In less accurate systems, N may be 64 and the maximum value of n is about 6. In the apparatus shown in FIG. 1, a reference condition occurs for a subject at infinity. In this case, shown by the two solid arrows, $n=0$ since the position of the first and second detector arrays 10a and 10b is identical.

The displacement of the second detection image with respect to the first detection image increases as the object moves closer. This is illustrated by the dashed arrow direct to array 10b in FIG. 1. The relationship between the object distance s and the number n of detectors by which the second detection image is displaced with respect to the first detection image is given by the following relation:

$$n=0fd/se,$$

where f is the focal length of lenses 12a and 12b, d is the separation between lenses 12a and 12b, and e is the detector-to-detector spacing in the detector arrays 10a and 10b.

The signal processing of the outputs from detector arrays 10a and 10b is performed by digital compute module 14 and control 16. Digital compute module 14 receives the output signals from detector arrays 10a and 10b and determines the number of elements n that the second detection image has been displaced with respect to the first detection image. The output of digital compute module 14 is preferably a digital word indicative of the number n. Since n is inversely proportional to the object distance s, the output of digital compute module 14 is indicative of distance s.

Control 16 controls the operation of detector arrays 10a and 10b and digital compute module 14. The operation of control 16 is initiated by a signal from the user, which may be produced, for example, by the closing of contacts.

In the embodiments shown in FIG. 1, the output of detector arrays 10a and 10b is directed to digital compute module 14 in a serial fashion. This is an advantageous method of reading out data from detector arrays 10a and 10b, particularly when the arrays are charge coupled devices. Although parallel outputs from detector arrays 10a and 10b could also be used, this requires a large number of interconnections with digital compute module 14. When the number N of detectors in each array 10a and 10b becomes very large (which is desirable), serial output from detector arrays 10a and 10b becomes very advantageous.

When detector arrays 10a and 10b are charge coupled devices, control 16 provides signals which cause the serial transfer of the detector signals through the array and to digital compute module 14. The techniques for detecting radiation and shifting detector signals in charge coupled devices are well known. The output shift time is much shorter than the detection or integrate time of the detector arrays.

Figure 2:
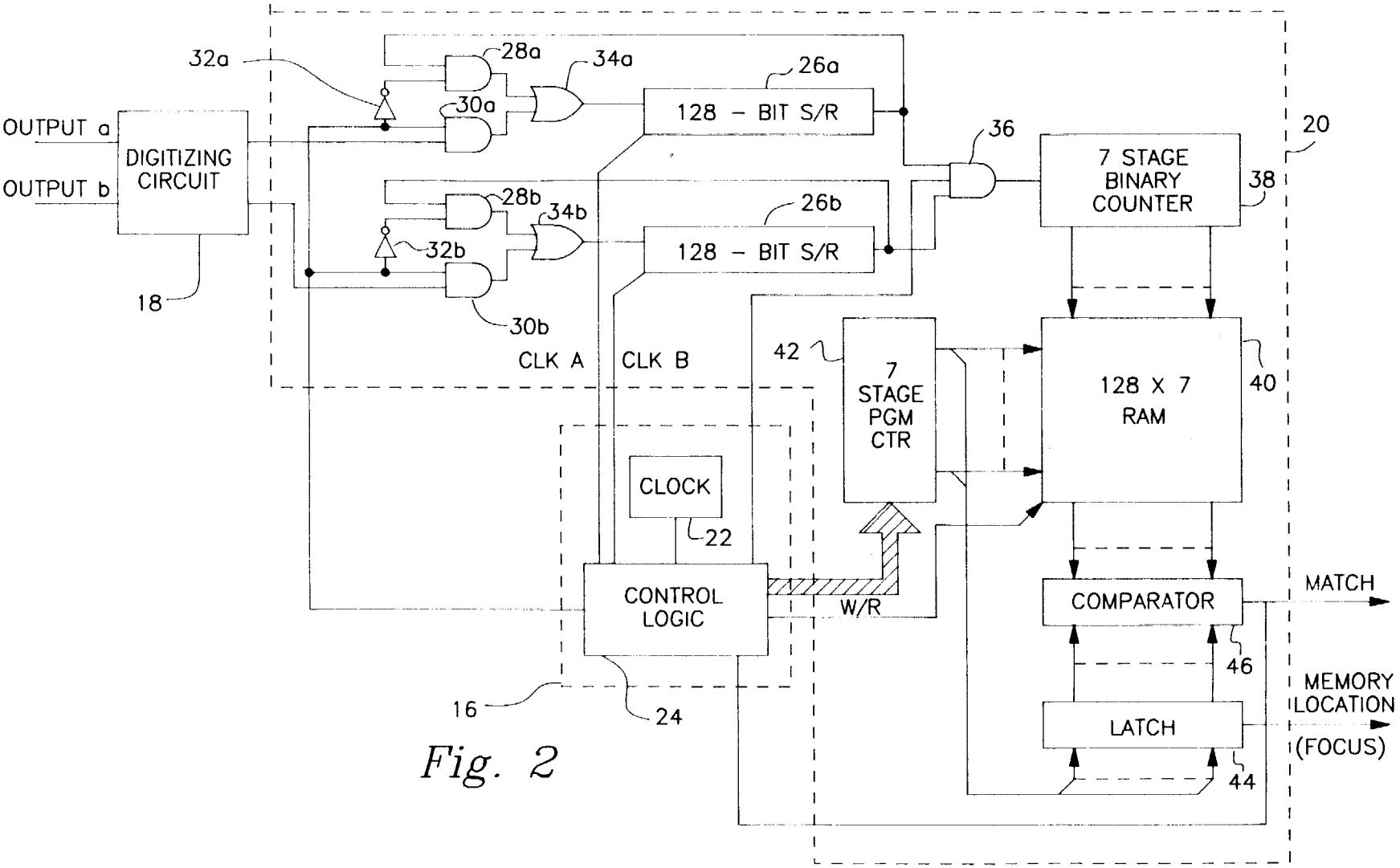
FIG. 2 shows the one embodiment of the signal processing circuitry of the present invention.

FIG. 2 shows one preferred embodiment of the signal processing circuit described in FIG. 1. This circuit is described and claimed in copending application of Ivars P. Breikss, Ser. No. 734,259, filed Nov. 19, 1976, and now U.S. Pat. No. 4,069,806 and assigned to the assignee of the present invention. The signal processing circuit includes digitizing circuit 18 and digital correlator circuit 20. Control 16 includes a clock 22 and control logic 24.

Digitizing circuit 18 receives the output signals from detector array 10a and 10b and digitizes those output signals. The digitized signals are first and second digitized representations of the first and second detection images. Digitizing circuit 18 can perform this function in several different manners.

First, each output element can be treated as a "1" if the level is above an average reference level and a "0" if below the reference level. Second, each element output can be set at a "1" if it is greater than the previous element output or a "0" if it is the same to within some limit. Values less than a previous detector output can be set at either "0" or "1". A "1" is only present, therefore, where a change in light level is present. Third, the light level may be digitized to recognize a range of levels. Rather than a "0" or "1" for each detector output, a digital word is produced for each detector output. The digital word represents the light level (or the log of the light level).

Digital correlator 20 repeatedly compares the first and second digitized representations and produces an output signal indicative of the number n. In the particular embodiment shown in FIG. 2, digital correlator 20 performs digital correlation between two words of equal length (128 bits). The specific implementation of the digital correlator will, of course, differ slightly depending upon the length of the two words.

The two digital words from digitizing circuit 18 are initially shifted into shift registers 26a and 26b. Logic circuits are provided with each shift register to place the shift registers in a recirculate mode after initial loading. These logic circuits include AND gates 28a, 28b, 30a, and 30b, inverters 32a and 32b, and OR gates 34a and 34b.

The two digital words from digitizing circuit 18 are received by AND gates 30a and 30b. A control signal from control logic 24 is also received by AND gates 30a and 30b. The outputs of AND gates 30a and 30b are inputs to OR gates 34a and 34b, respectively. The control signal from control logic 24 is inverted by inverters 32a and 32b and forms inputs to AND gates 28a and 28b. The outputs of shift registers 26a and 26b are the other inputs to AND gates 28a and 28b, respectively. The output of AND gates 28a and 28b are inputs to OR gates 34a and 34b, respectively.

In operation, a logic "1" from control logic 24 enables AND gates 30a and 30b and allows new digital words to be entered into shift registers 26a and 26b. The logic "1" disables AND gates 28a and 28b so that the information presently stored in the shift registers 26a and 26b is not re-entered.

After the digital words have been entered into shift registers 26a and 26b, the control signal from control logic 24 changes to a logic "0", thereby enabling AND gates 28a and 28b and disabling AND gates 30a and 30b. Shift registers 26a and 26b, therefore, are in a recirculating mode.

The contents of shift registers 26a and 26b are then shifted (recirculated) in response to the two clock signals, $CLK_a$ and $CLK_b$, supplied by control logic 24. Each time a logic "1" occurs at the outputs of registers 26a and 26b simultaneously, AND gate 36 produces an output coincident with the strobe pulse generated by control logic 24. The output pulses of AND gate 36 are counted in binary counter 38. The number of clock pulses $CLK_a$ and $CLK_b$ correspond exactly to the number of bits in shift registers 26a and 26b. Upon completion of one complete circular shift, the count accumulated in counter 38 is entered into random access memory 40 at a location determined by the state of address counter 42. At the initiation of the correlation sequence, address counter 42 is cleared. This causes the initial memory address and the first entry to occur at the lowest address.

Upon completion of the first circular shift of the contents of shift registers 26a and 26b, one extra clock pulse is produced at the clock input of shift register 26b. This shifts the contents of shift register 26b by one bit with respect to the contents of shift register 26a. At the same time, address counter 42 is incremented by one. Counter 38 is cleared, and the second circular shift of the contents of registers 26a and 26b is commenced. Again, outputs at gate 36 are counted in counter 38. This sequence continues until the number of shifts equals the value of n corresponding to the nearest subject distance to be considered. Each time the circular shift is completed, the contents of counter 38 are placed in memory 40 at the next higher address obtained by incementing address counter 42 by one for each completed circular shift.

The best correlation, which corresponds to the distance between the object and the first and second detector arrays, is the address of the largest count stored in the memory 40 during the correlation process. The final step is the determination of this address. The largest number in the memory is determined as follows.

Address counter 42 is set to the highest address, which corresponds to all "1's" in address counter 42. This address is then stored in latch 44. Alternatively, the number stored in latch 44 can be derived from a source other than address counter 42. What is required is that the number stored in latch 44 initially be as high as the highest count possibly contained in memory 40 (i.e. all "1's"). The number in latch 44 must be decremented by one each time a complete check of memory 40 has found no match. Address counter 42 is a convenient means for providing the numbers and decrementing the number.

After the highest count is stored in latch 44, address counter 32 is decremented to zero. All locations in memory 40 are addressed in sequence and are compared to the contents of latch 44 by comparator 46. If any of the locations in memory 40 contain all "1's", comparator 46 issues an output indicating a match has occurred. At this point, the correlation process is stopped and the particular address contained in address counter 42 at that time is entered into latch 44. This address corresponds to the number "n".

If no match is found to the highest count, address counter 42 is decremented by one from its previous highest count and this count is stored in latch 44. The address countdown and comparison is then repeated. The process of decrementing the address and comparing to the contents of memory 40 to the contents of latch 44 continues until a match is found. At this point, the correlation process is concluded. The particular memory address at which the match occurs is the number "n" which forms the output signal of the signal processing circuit.

The embodiment of the signal processing circuit shown in FIG. 2 is particularly advantageous because it uses a relatively small number of circuit elements. Other forms of signal processing, however, may also be used. An important consideration is minimizing complexity of the digital compute module 14 and control 16 shown in FIg. 1. This allows detector arrays 10a and 10b, digital compute module 14, and control 16 to be formed in a single monolithic integrated circuit, or in a relatively small number of integrated circuits.

Figure 3:
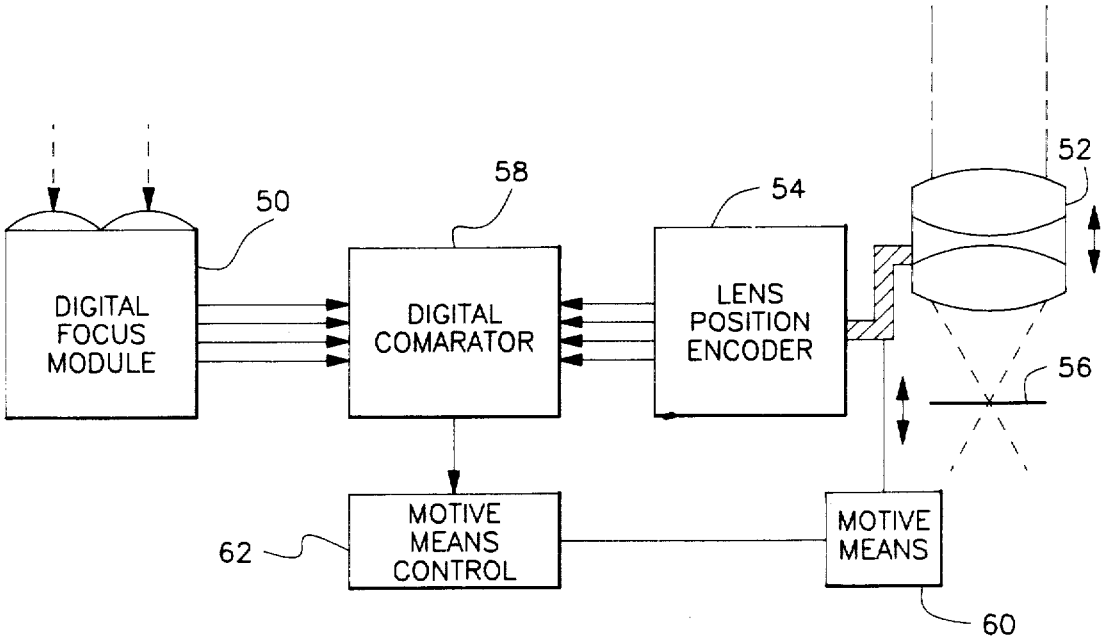
FIG. 3 shows a digital automatic focus system.

FIG. 3 shows a digital automatic focus system which may be used in photographic equipment such as a still or movie camera. The system includes a digital focus module 50, which preferably is apparatus like that shown in FIG. 1. The output of digital focus module 50 is a first digital word which is used to control a position of a primary optical means 52 such as the taking lens of a still or movie camera. A lens position encoder 54 provides a second digital word indicative of the position of optical means 52 with respect to film 56. Digital comparator 58 compares the first and second digital words. The position of optical element 52 is determined by motive means 60, which is controlled by motive means control 62. The output of digital comparator 58 is connected to motive means control 62 so that the position of optical means 52 with respect to film 56 is controlled by the comparison of the first and second digital words.

In the system shown in FIG. 3, the first digital word from digital focus module 50 represents the desired position of optical means 52. When the position of optical element 52, as represented by the second digital word, is identical to the first digital word, the system is in focus. In the case of a still camera, the motion of optical element 52 is stopped at this point. In a continuous focus system for a motion picture camera, the position is controlled to always return the lens to the best image focus position. In other words, as the first digital word changes, the position of optical element 52 is adjusted to bring the second digital word in agreement with the first digital word.

When digital focus module 50 is in the form shown in FIG. 1, the digital number n which forms the first digital word is:

$$n = fd/se,$$

where f is the auxiliary lens focal length, d is the auxiliary lens separation, e is the detector-to-detector spacing, and s is the object distance. The camera taking lens displacement for focus is:

$$\Delta l = f_t^2/s - f_t$$

where $f_t$ is the taking lens focal length. Where the object-to-camera distance is several times the focal length of the taking lens:

$$\Delta l \approx f_t^2/s,$$

or $$\Delta l \propto n.$$

The lens extension for focus is very nearly proportional to n, where n is the number of detector elements the image has been displaced relative to the reference condition (object at infinity). The system requires little or no special geometric correction.

The system of FIG. 3 may take a number of different forms. For example, motive means 60 may be a motor and motive means control 62 may be a motor-drive control. Alternatively, motive means 60 may be in the form of a mechanical arrangement including springs.

Similarly, lens position encoder 54 may take a variety if well known forms. The position of optical element 52 may be sensed in an analog manner which is then converted to a digital word by a digital-to-analog converter. It is preferable, however, for the encoding of the position of optical element 52 to be done directly in a digital manner.

In one preferred embodiment in which the automatic focus system is used in a still camera, primary optical means 52 is preset at the near subject focus. Optical means 52 is then released to move toward film 56. As it moves, a series of pulses is produced, one pulse for a movement of, for example, 0.001 inches. The pulse count is converted to a second digital word indicative of the position of optical means 52. The pulses may originate from an optical mask with small holes which move in front of a light source and produce pulses on a detector. The optical mask is, in this embodiment, attached to optical means 52.

In another embodiment, in which a rotating member is used to advance optical means 52, a shaft revolution counter generates pulses or a rotating gear activates a contact. The count produced is, once again, converted to a second digital word which is compared with the first digital word by digital comparator 58. Motion of optical means 52 is halted when the two words are identical.

In a continuous focus system for use in a motion picture camera, a position encoder mask may be used which is the linear equivalent of a shaft position encoder. A second digital word is, therefore, generated which indicates lens position. This second digital word is then compared to the first digital word. The output of digital comparator 58 gives direction information to refocus optical element 52.

In conclusion, the system of the present invention provides an accurate determination of distance from the apparatus to an object and provides simplified automatic focus control for use in a variety of optical systems. The present invention has a minimum of moving parts, uses digital rather than analog methods, and provides significant savings in size, weight, and mechanical complexity over prior art systems. Although the invention has been described with reference to a series of preferred embodiments, it will be understood by those skilled in the art that changes in form and detail may be made without departing from the spirit and scope of the invention.

The embodiments of the invention in which an exclusive property or right is claimed are defined as follows:

[1. Apparatus for providing an indication of the distance between the apparatus and an object, the apparatus comprising:

first detector array positioned to receive a first detection image of the object and to provide output signals indicative of radiation received;

second detector array positioned to receive a second detection image of the object and to produce output signals indicative of radiation received, the second detection image being displaced by a number n of detectors in the second detector array with respect to the position of the first detection image on corresponding detectors of the first detector array, the number n being indicative of the distance between the object and the first and second detector arrays; and signal processing means for receiving the output signals from the first and second detector arrays including digitizing means for digitizing the output signals from the first and second detector arrays to produce first and second digitized representations of the first and second detection images, respectively; and digital correlator means for comparing the first and second digitized representation and providing an output signal indicative of the number n.]

[2. The apparatus of claim 1 wherein the second digitized representation is displaced by n digits.]

[3. The apparatus of claim 2 wherein n equals 0 for an object at infinity.]

[4. The apparatus of claim 1 wherein the output signal of the signal processing means is a digital word.]

[5. The apparatus of claim 4 wherein the digital word is a digital representation of the number n.]

[6. The apparatus of claim 1 wherein the first and second detector array each contain N detector elements.]

[7. The apparatus of claim 6 wherein the first and second detector arrays are portions of a monolithic integrated circuit.]

[8. The apparatus of claim 7 wherein the signal processing means also is a portion of the monolithic integrated circuit.]

[9. The apparatus of claim 1 and further comprising: positioning means for positioning an optical element in response to the output signal.]

[10. The apparatus of claim 9 wherein the output signal of the signal processing means is a first digital word.]

[11. The apparatus of claim 10 wherein the positioning means comprises:

position encoder means for providing a second digital word indicative of the position of the optical element;

comparator means for comparing the first and second digital words and providing an output signal indicative of the comparison;

motive means for moving the optical element; and control means for controlling the motive means in response to the output signal of the comparator means.]

[12. A method of determining the distance to an object, the method comprising:

providing, at a first detector array, a first detection image of the object, the first detector array producing a first signal;

providing at a second detector array, a second detection image of the object, the second detector array producing a second signal, the second detection image being displaced by a number n of detectors in the second detector array with respect to corresponding detectors of the first detector array, the number n being indicative of the distance between the object and the first and second detector arrays; converting the first and second signals to digital output signals; in a digital correlator and comparing the output signals to determine the number n.]

13. Automatic focus control apparatus for use in an optical system including a primary optical means, the automatic focus control apparatus comprising:

[focus detecting means for providing a first digital word indicative of the distance between the focus detecting means and an object; ] *a first detector array positioned to receive a first detection image of an object and to provide output signals indicative of the radiation received;*

*a second detector array positioned to receive a second detection image of the object and to produce output signals indicative of radiation received, the second detection image being displaced by a number n of detectors in the second detector array with respect to the position of the first detection image on corresponding detectors of the first detector array, the number n being indicative of the distance between the object and the first and second detector arrays;*

*signal processing means for receiving the output signals from the first and second detector arrays and producing a first digital word indicative of n;* position encoder means for providing a second digital word indicative of the position of the primary optical means;

comparator means for comparing the first and second digital words and providing an output signal indicative of the comparison;

motive means for moving the primary optical means; and control means for controlling the motive means in response to the output signal of the comparator means.

[14. The automatic focus control apparatus of claim 13 wherein the focus detecting means comprises:

first detector array positioned to receive a first detection image of the object and to provide output signals indicative of radiation received;

second detector array positioned to receive a second detection image of the object and to produce output signals indicative of radiation received, the second detection image being displaced by a number n of detectors in the second detector array with respect to the position of the first detection image on corresponding detectors of the first detector array, the number n being indicative of the distance between the object and the first and second detector arrays; and signal processing means for receiving the output signals from the first and second detector arrays and producing the first digital word.]

15. The automatic focus control apparatus of claim 13 wherein the optical system is a photographic system and the primary optical means is a taking lens.

[16. Apparatus for providing an indication of the distance between the apparatus and an object, the apparatus comprising:

first and second detector arrays for producing output signals indicative of radiation received;

first auxiliary means for providing, at the first detector array, a first detection image of the object;

second auxiliary means for providing, at the second detector array, a second detection image of the object, the second detection image being displaced by a number n of detectors in the second detector array with respect to corresponding detectors of the first detector array, the number n being indicative of the distance between the object and the first and second detector arrays; and signal processing means for receiving the output signals from the first and second detector arrays including digitizing means for digitizing the output signals from the first and second detector arrays; and digital correlator means for comparing the digitized output signals from the first and second detector arrays and providing an output signal indicative of the number n.]

[17. The apparatus of claim 16 wherein the first and second detector arrays are portions of a monolithic integrated circuit.]

[18. The apparatus of claim 17 wherein the signal processing means also is a portion of the monolithic integrated circuit.]

[19. The apparatus of claim 16 wherein the first and second detector arrays comprise charge coupled devices.]

[20. The apparatus of claim 19 wherein the output signals are serially shifted out of the first and second detector arrays in response to shift signals from the signal processing means.]

*21. Apparatus for providing an indication of the distance between the apparatus and an object, the apparatus comprising:*

*first detector array positioned to receive a first detection image of the object and to provide output signals indicative of radiation received;*

*second detector array positioned to receive a second detection image of the object and to produce output signals indicative of radiation received, the second detection image being displaced by a number n of detectors in the second detector array with respect to the position of the first detection image on corresponding detectors of the first detector array, the number n being indicative of the distance between the object and the first and second detector arrays; and*

*signal processing means for receiving the output signals from the first and second detector arrays, including digitizing means for digitizing the output signals from the first and second detector arrays to produce first and second digitized representations of the first and second detection images, respectively; and digital correlator means for comparing the first and second digitized representation and providing an output signal indicative of the number n; and*

*positioning means for positioning an optical element for response to the output signal wherein the output signal of the signal processing means is a first digital word; and*

*wherein the positioning means comprises position encoder means for providing a second digital word indicative of the position of the optical element; and*

*comparator means for comparing the first and second digital words and providing an output signal indicative of the comparison; and*

*motive means for moving the optical element; and*

*control means for controlling the motive means in response to the output signal of the comparator means.*

* * * * *